United States Patent [19]
Johnson et al.

[11] Patent Number: 5,283,043
[45] Date of Patent: Feb. 1, 1994

[54] DIRECT CRYSTALLIZATION OF ORGANIC-SWELLED LAYERED SILICATES AND PREPARATION OF LAYERED SILICATES CONTAINING INTERLAYER POLYMERIC CHALCOGENIDES THEREFROM

[75] Inventors: Ivy D. Johnson, Medford; Michael E. Landis, Woodbury, both of N.J.

[73] Assignee: Mobil Oil Corp., Fairfax, Va.

[21] Appl. No.: 869,589

[22] Filed: Apr. 16, 1992

[51] Int. Cl.$^5$ ................................................ C01B 33/34
[52] U.S. Cl. ................................... 423/328.2; 423/332;
501/146; 501/148; 502/152; 502/164; 502/240;
502/241; 502/242; 502/243; 502/244; 502/246;
502/247; 502/250; 502/253; 502/254; 502/255;
502/256; 502/258; 502/259; 502/260; 502/261;
502/262; 502/263
[58] Field of Search ............... 502/152, 164, 240, 241,
502/242, 243, 244, 246, 247, 250, 253, 254, 255,
256, 258, 259, 260, 261, 262, 263; 423/328.2;
501/332, 146, 148

[56] References Cited

U.S. PATENT DOCUMENTS

| | | | |
|---|---|---|---|
| 4,791,088 | 12/1988 | Chu et al. | 423/332 |
| 4,859,648 | 8/1989 | Landis et al. | 502/242 |
| 4,956,517 | 9/1990 | Johnson et al. | 585/660 |
| 4,968,652 | 1/1990 | Johnson et al. | 423/328.2 |
| 5,102,643 | 4/1992 | Kresge et al. | 423/328 |
| 5,108,725 | 4/1992 | Beck et al. | 423/263 |

Primary Examiner—Anthony Green
Attorney, Agent, or Firm—Alexander J. McKillop; Dennis P. Santini; Edward F. Kenehan, Jr.

[57] ABSTRACT

There is provided a method for preparing organic-swelled layered silicate by direct crystallization from an alkaline reaction mixture containing a source of silicon oxide and organic onium compound, e.g., a cetyltrimethylammonium salt. Layered silicates containing interlayer polymeric chalcogenide are prepared by contacting the organic-swelled layered silicate with a source of polymeric chalcogenide, e.g., tetraethylorthosilicate.

19 Claims, No Drawings

DIRECT CRYSTALLIZATION OF ORGANIC-SWELLED LAYERED SILICATES AND PREPARATION OF LAYERED SILICATES CONTAINING INTERLAYER POLYMERIC CHALCOGENIDES THEREFROM

The present invention relates to a method for direct crystallization of organic-swelled layered silicate materials, like organic-swelled kenyaite and magadiite. In another aspect, the present invention relates to the preparation of a layered silicate which contains an interspathic polymeric chalcogenide, e.g., kenyaite, intercalated with polymeric silica, using directly crystallized organic-swelled layered silicate material as an intermediate.

Many layered materials are known which have three-dimensional structures which exhibit their strongest chemical bonding in only two dimensions. In such materials, the stronger chemical bonds are formed in two-dimensional planes and a three-dimensional solid is formed by stacking such planes on top of each other. However, the interactions between the planes are weaker than the chemical bonds holding an individual plane together. The weaker bonds generally arise from interlayer attractions such as Van der Waals forces, electronic interactions, and hydrogen bonding. In those situations where the layered structure has electronically neutral sheets interacting with each other solely through Van der Waals forces, a high degree of lubricity is manifested as the planes slide across each other without encountering the energy barriers that arise with strong interlayer bonding. Graphite is an example of such a material. The silicate layers of a number of clay materials are held together by electrostatic attraction mediated by ions located between the layers. In addition, hydrogen bonding interactions can occur directly between complementary sites on adjacent layers, or can be mediated by interlamellar bridging molecules.

Laminated materials such as clays may be modified to increase their surface area. In particular, the interlamellar spacing can be increased substantially by absorption of various swelling agents such as water, ethylene glycol, amines, ketones, etc., which enter the interlamellar space and push the layers apart. However, the interlamellar spaces of such layered materials tend to collapse when the molecules occupying the space are removed, for example, by exposing the clays to high temperatures. Accordingly, such layered materials having enhanced surface area are not suited for use in chemical processes involving even moderately severe conditions.

Layered metal chalcogenide materials enjoying thermal stability can be prepared by a method described in U.S. Pat. No. 4,859,648, and incorporated herein by reference. The method comprises treating a layered chalcogenide, e.g., oxide, of at least one element having an atomic number of 4, 5, 12 to 15, 20 to 33, 38 to 51, 56 to 83 and greater than 90, inclusive, which contains ion exchange sites having interspathic cations associated therewith, with an organic compound which is a cationic species, e.g., n-alkylammonium, or capable of forming a cationic species e.g., n-alkylamine, to effect exchange with said interspathic cations in order to swell the layered material. An electrically neutral compound capable of conversion to an interspathic polymeric chalcogenide, e.g., tetraethylorthosilicate, is thereafter provided between the layers of the swelled, layered chalcogenide. The compound is then converted to the interspathic polymeric chalcogenide to form the layered material. Layered silicates, e.g., magadiite, can be intercalated with polymeric silica by this technique. However, this process requires a separate step to incorporate organic material between the silicate layers; moreover, the organic used, e.g., primary amine such as n-octylamine, can be noxious. The resulting swelled silicate is often difficult to manipulate, requiring long filtration and drying times. Accordingly elimination of this separate step would be highly advantageous.

It is known in the art to crystallize silicates and aluminosilicates in the presence of amines made up of $C_5$-carbon chains to form monomeric organo-silicates (Deschler et al., Chem. Int. Ed. Engl. 25, p. 236-252 (1986)), organo-silicate polymers or tectosilicates, e.g., zeolites (U.S. Pat. No. 3,702,886). It is also known to prepare the layered silicate, makatite, in the presence of triethanolamine used as a complexing agent to produce large crystals without intercalating the organic (Annehed et al., Zeitschrift fur Kristallographie 159, p. 203-210 (1982)).

It has now been found that an organic-swelled crystalline layered silicate which contains organic material between its layers can be prepared by direct crystallization by a method comprising:

a) providing a highly alkaline reaction mixture comprising water, potassium ions, a source of silicon oxide and an organic onium compound of the formula $R^1R^2R^3R^4M^+X^-$ wherein each R can have up to 24 carbon atoms and is selected from the group consisting of alkyl or alkenyl of up to 24 carbon atoms or combinations thereof, provided at least one R has at least eight, preferably at least 12, e.g., about 16, carbon atoms; M is an element capable of coordination with said $R^1$, $R^2$, $R^3$ and $R^4$ to form a cation, e.g., M can be a tetracoordinatable element (such as nitrogen, phosphorus, arsenic, antimony or bismuth); and $X^-$ is an anion (e.g., fluoride, chloride, bromide, iodide, hydroxide, acetate, sulfate, or carboxylate), said mixture having a pH of at least 9.0, e.g., about 12 to 14 and preferably at least about 13.5;

b) heating said reaction mixture to a temperature between about 90° C. to 200° C., preferably from about 125° C. to 175° C., e.g., about 140° C. to 160° C.; and c) maintaining said reaction mixtures at a temperature of from about 90° C. to 200° C., preferably from about 125° to 175° C., e.g., about 140° C. to 160° C., and a pH of about 9 to 14, preferably about 12 to 14, e.g., about 12 to 13, until crystals of a layered silicate material containing intercalated organic material derived from said onium compound are formed. Preferably, the reaction mixture is agitated during formation of said crystals.

The reaction mixture comprises a source of alkali metal, e.g., sodium or potassium. The onium compound can be a quaternary ammonium compound, preferably a tetraalkylammonium compound. Such tetraalkylammonium compounds comprise at least one $C_{8+}$ alkyl group, i.e., $C_8$ or greater, preferably at least one $C_{12+}$ alkyl group, more preferably at least one $C_{15+}$ alkyl group. For example, the tetraalkylammonium compound can be a cetyltrimethylammonium salt, i.e., $CH_3(CH_2)_{15}N(CH_3)_3^+X^-$.

The sources of silicon oxide used include conventional materials such as amorphous precipitated silica, sodium silicate, and colloidal silica.

The reaction mixture employed can have the following molar ratio ranges:

$A_2O/SiO_2 = 0.02$ to 0.15, preferably 0.04 to 0.10

$SiO_2/H_2O = 0.02$ to $0.15$, preferably $0.05$ to $0.10$
$R^1R^2R^3R^4M^+X^-/SiO_2 = 0.02$ to $0.20$, preferably $0.05$ to $0.10$
wherein A is an alkali metal.

After its preparation, the organic-swelled layered silicate can be treated with a compound capable of forming the above-described polymeric chalcogenide. Preferably, such compounds are capable of forming the polymeric chalcogenide upon hydrolysis or other polymerizing reactions. Electrically neutral, hydrolyzable compounds, e.g., tetraalkylorthosilicates, are well-suited as such compounds. It is preferred that the organic present between the layers be capable of being removed from the layered chalcogenide material without substantial disturbance or removal of the interspathic polymeric chalcogenide. For example, organic cations such as cetyltrimethylammonium may be removed by exposure to elevated temperatures, e.g., calcination, in nitrogen or air, or chemical oxidation conditions, preferably after the interspathic polymeric chalcogenide precursor has been converted to the polymeric chalcogenide in order to form a thermally stable layered material.

The polymeric chalcogenide precursor-containing product can be exposed to suitable conversion conditions, such as hydrolysis and/or calcination to effect conversion of the precursor to the polymeric chalcogenide. The hydrolysis step may be carried out by any method, for example, by interspathic water already present in organic-swelled layered silicate material. Because of the effect of interspathic water on hydrolysis, the extent of hydrolysis may be modified by varying the extent to which the organic-swelled species is dried prior to addition of the polymeric chalcogenide precursor.

After said conversion to the polymeric chalcogenide, the resulting products, especially when calcined, exhibit high surface area, e.g., greater than 200, 300, 400 or even 600 m²/g, and thermal and hydrothermal stability, making them highly useful for hydrocarbon conversion processes as catalysts or catalytic supports.

The invention can also be described as relating to a method for preparing a layered silicate containing an interspathic polymeric chalcogenide of at least one element selected from Groups IB, IIB, IIIA, IIIB, IVA, IVB, VA, VB, VIA, VIIA and VIIIA of the Periodic Table (Fisher Scientific Co. Catalog No. 5-702-10, 1978) from the directly crystallized organic-swelled layered silicate, a compound capable of conversion to said interspathic polymeric chalcogenide, preferably interspathic polymeric oxide, e.g., polymeric silica, and converting said compound to the interspathic polymeric chalcogenide to form said layered silicate containing an interspathic polymeric chalcogenide which acts as a pillar between the layers.

The polymeric chalcogenide pillars are formed from a precursor material which is preferably introduced between the layers of the organic-swelled species as a cationic, or more preferably, electrically neutral, hydrolyzable compound of the desired elements, e.g., those of Group IVB, e.g., Si or Ge. The precursor material is preferably an organometallic compound which is a liquid under ambient conditions. In particular, hydrolyzable compounds, e.g., alkoxides, of the desired elements of the pillars are utilized as the precursors. Suitable polymeric silica precursor materials include tetraalkylsilicates, e.g., tetrapropylorthosilicate, tetramethylorthosilicate and, most preferably, tetraethylorthosilicate (TEOS). Where the pillars are also required to include polymeric alumina, a hydrolyzable aluminum compound can be contacted with the organic "propped" species before, after or simultaneously with the contacting of the layered chalcogenide with the silicon compound. Preferably, the hydrolyzable aluminum compound employed is an aluminum alkoxide, e.g., aluminum isopropoxide. If the pillars are to include polymeric titania, a hydrolyzable titanium compound such as titanium alkoxide, e.g., titanium isopropoxide, may be used.

After hydrolysis to produce the polymeric chalcogenide pillars prior to calcination, the pillared product may contain residual exchangeable cations. Such residual cations in the layered material can be ion exchanged by known methods with other cationic species to provide or alter the catalytic activity of the pillared product. Suitable replacement cations include cesium, cerium, cobalt, nickel, copper, zinc, manganese, platinum, lanthanum, aluminum, ammonium, hydronium and combinations thereof.

Layered silicates include high silica alkali silicates such as magadiite, natrosilite, kenyaite, makatite, nekoite, kanemite, okenite, dehayelite, macdonaldite, and rhodesite. The organic-swelled, layered silicates prepared by the present invention are derived from high silica alkali silicates whose layers lack octahedral sheets. These materials are prepared hydrothermally from a highly alkaline aqueous reaction mixture containing sources of silicon oxide, silica and organic at relatively moderate temperatures and pressures. These organic-swelled, layered silicates may contain tetracoordinate framework atoms other than Si. Such layered silicates can be prepared by co-crystallizing in the presence of non-silicon tetravalent elements, e.g., those selected from the group consisting of Al, B, Cr, Fe, Ga, In, Ni, Zr as well as any other such elements which are catalyticaly useful when incorporated in the silicate structure. Alternatively, non-silicon framework elements already in a layered silicate may be substituted by a tetracoordinate element. For example, kenyaite containing boron in its framework when treated with aluminum nitrate results in a kenyaite which contains aluminum in its framework. Both co-crystallized and substituted organic-swelled layered, high silica alkali silicates may be treated by the present invention to provide layered materials containing interspathic polymeric chalcogenides.

Synthetic magadiite layered silicates intercalated with an organic swelling agent are readily synthesized hydrothermally from an organic-swelled reaction mixture containing inexpensive sources of silica, caustic and organic onium compound. Elements other than silicon, e.g., those selected from the group consisting of Al, B, Cr, Fe, Ga, In, Ni, Zr and other catalytically useful metals, may be added to the reaction mixture to produce organic-swelled synthetic magadiite layered silicates. The reaction mixture for synthetic magadiite materials can be described in molar ratios as follows:

| | |
|---|---|
| $SiO_2/T_2O_3$ | = 10 to infinity where T can be Al, B, Cr, Fe, Ga, and/or Ni or other catalytically useful metal |
| $A^+OH^-/SiO_2$ | = 0 to 0.6, (preferably 0.1 to 0.6; A = any alkali metal |
| $H_2O/SiO_2$ | = 8 to 500, preferably 10 to 40 |

-continued

| | | |
|---|---|---|
| $R^1R^2R^3R^4M^+X^-/SiO_2$ | = | 0.02 to 1.0, preferably 0.04 to 0.30 | where R, M and X are as described above.

The reaction mixture can be maintained at a temperature of about 100° to 200° C. for anywhere from about 1 to 150 days, preferably 1 to 6 days, in order to form a product having the following composition:

| | | |
|---|---|---|
| % M | = | 0 to 3, e.g., 0 to 0.3 |
| $SiO_2/T_2O_3$ | = | 10 to infinity, preferably 10 to 200 |
| % C | = | 5 to 100, preferably 5 to 50 |
| $A_2O/SiO_2$ | = | 0 to 0.5, preferably 0.05 to 0.1 | where A, M and T are as described above.

The synthetic layered silicate materials thus prepared contain organic swelling agent between their layers. Introduction of interspathic polymeric chalcogenides as earlier described can increase the surface area and thermal stability of these materials. The resulting material may then be calcined to remove residual organics.

Another aspect of the present invention resides in preparing synthetic kenyaite materials which contain interspathic polymeric oxides. Kenyaite, a layered silicic acid which is known to exist in nature as a sodium salt $Na_2Si_{22}O_{45}H_2O$ can be prepared in the potassium form $K_2Si_{22}O_{45}10H_2O$ in the laboratory. Organic-swelled synthetic kenyaite is readily synthesized hydrothermally from a reaction mixture containing inexpensive sources of silica, caustic, preferably KOH and organic onium compound. Tetracoordinate elements other than silicon, e.g., those selected from the group consisting of Al, B, Cr, Fe, Ga, In, Ni, Zr and other catalytically useful metals, may be added to the reaction mixture to produce organic-swelled synthetic kenyaite layered silicates. $Al(NO_3)_3 \cdot 9H_2O$ and aluminum-tri-sec-butoxide are suitable reagents for the introduction of non-silicon tetracoordinate elements in the kenyaite framework. Co-crystallizing with B, Al, and/or Zr is particularly preferred. The resulting organic-swelled, layered silicates can then be further treated to prepare a polymeric chalcogenide-intercalated product.

The following examples further describe the synthesis and subsequent pillaring of the novel organic-swollen layered silicates of the present invention.

EXAMPLE 1

Ultrasil amorphous precipitated silica (65 g, 1 mole), available from PQ Corporation, Valley Forge, Pa., was slurried in $H_2O$ (200 g) and then added to an aqueous KOH solution (6 g 85% KOH in 50 g $H_2O$). To this mixture was added a solution containing cetyldimethylethylammonium bromide $(CH_3(CH_2)_{15}N(CH_3)_2(C_2H_5))Br$ (34 g, 0.09 moles) in $H_2O$ (100 g). The reaction mixture was stirred thoroughly, then crystallized at 150° C. for 120 hrs in a stirred 600 ml autoclave. The product was filtered, washed with $H_2O$, and air dried. The basal spacing as determined by X-ray diffraction was 31 Angstroms and the surface area was 220 $m^2/g$. Other X-ray diffraction lines were found at 15.9 Angstroms, 3.33 Angstroms and 1.84 Angstroms. The chemical composition of the as-synthesized, air dried material, in % by weight, is given in the Table.

EXAMPLE 2

60 g of the as-synthesized, air dried material from Example 1 was pillared directly with tetraethylorthosilicate (TEOS) by suspending it in TEOS (300 g) and stirring for 24 hrs in a closed polypropylene jar. The slurry was filtered and air dried (I). A portion of (I), 30 g, was calcined at 540° C. for 3 hrs. The basal spacing of the pillared, calcined material was 42 Angstroms and the surface area was 393 $m^2/g$. The remainder of (I) was suspended in $H_2O$, 10 g $H_2O$/g solids, stirred for 2 hrs, filtered, and air dried (II). 15 g of (II) were calcined at 540° C. for 3 hrs. This material after calcination was X-ray amorphous and had a surface area of 329 $m^2/g$. The remainder of (II) was suspended in TEOS, 5 g TEOS/g solids, stirred for 2 hrs, filtered, air dried and calcined at 540° C. for 3 hrs. The basal spacing of this material was also about 40 Angstroms and the surface area was 211 $m^2/g$.

EXAMPLE 3

The synthesis described in Example 1 wa repeated and the crystallization time was increased to 168 hrs. The product had an X-ray diffraction pattern similar to the product of Example 1, but there were also peaks attributed to an impurity phase. The composition is given in the Table.

EXAMPLE 4

Ultrasil (65 g, 1 mole) was suspended in $H_2O$ (200 g). The resulting slurry was added to an aqueous KOH solution (6 g, 0.09 moles). To this slurry, a 50% by weight cetyltrimethylammonium chloride solution $CH_3(CH_2)_{15}N(CH_3)Cl$ (28.8 g, 0.045 mols) was added. The reagents were mixed thoroughly, then crystallized at 150° C. for 120 hrs in a stirred 600 ml autoclave. The product was filtered, washed with $H_2O$, and air dried. The basal spacing, measured by X-ray diffraction, is 37 Angstroms. The product composition is given in the Table.

EXAMPLE 5

The synthesis described in Example 4 was repeated with the amount of $CH_3(CH_2)_{15}N(CH_3)_3Cl$ having been increased to 57.6 (0.09 moles). The product had a basal spacing, measured by X-ray diffraction, of 38 Angstroms. The product composition is given in the Table.

EXAMPLE 6

The synthesis of the organoammonium swollen silicate of Example 4 was repeated but with the following amounts of reagents:

| |
|---|
| 65 g Ultrasil in 200 g $H_2O$ |
| 12 g KOH in 50 g $H_2O$ |
| 57.6 g $CH_3(CH_2)_{15}N(CH_3)_3Cl$. |

The basal spacing, measured by X-ray diffraction, is 37 Angstroms. The composition is given in the Table.

Magadiite swollen silicates were prepared by the following procedures:

EXAMPLE 7

Ultrasil (65 g, 1 mole) was slurried in $H_2O$ (200 g) and then added to an aqueous NaOH solution (21 g in 50 g $H_2O$). An aqueous solution of cetyltrimethylammonium chloride (125 g of a 25% solution) was added. The reaction mixture was stirred thoroughly then crystallized at 150° C. for 240 hrs. in a stirred 600 ml autoclave. The product was filtered, washed with H₂O, and air dried. The chemical composition is given in the Table. The X-ray diffraction lines are at 37.4, 27.8, 18.7, 13.6, 4.25, 3.68, 3.46, 1.83, and 1.75 Angstroms.

EXAMPLE 8

Ultrasil (65 g, 1 mole) was slurried in H₂O (200 g) and then added to an aqueous NaOH solution (21 g in 50 g H₂O). An aqueous solution of cetyltrimethylammonium chloride (125 g of a 25% solution) was added. The reaction mixture was stirred thoroughly then crystallized at 150° C. for 360 hrs. in a stirred 600 ml autoclave. The product was filtered, washed with H₂O, and air dried. The chemical composition is given in the Table. The X-ray diffraction lines are at 38.4, 19.9, 4.07, 3.66, 3.48, and 1.84 Angstroms.

TABLE

CHARACTERIZATION OF SILICATES AS-SYNTHESIZED

| SAMPLE | SiO₂ | Al₂O₃ | K/Na | C | N | Br | ASH |
|---|---|---|---|---|---|---|---|
| Example 1 | 30.3 | 0.036 | 0.111 | 9.77 | 0.52 | 0.12 | 27.40 |
| Example 3 | 53.8 | — | 0.580 | 12.8 | 0.71 | 0.76 | 56.04 |
| Example 4 | 74.8 | — | 0.154 | 15.9 | 0.84 | <0.01% | 77.00 |
| Example 5 | 79.8 | — | 0.290 | 14.1 | 0.73 | 0.07 | 79.78 |
| Example 6 | 57.6 | — | 0.650 | 23.0 | 1.3 | 0.25 | 60.39 |
| Example 7 | 60.0 | 0.103 | 0.200 | 33.10 | 1.51 | — | 57.21 |
| Example 8 | 42.6 | 0.1030 | 0.71 | 36.9 | 1.99 | — | 43.2 |

It is claimed:

1. A method for preparing by direct crystallization an organic-swelled crystalline layered silicate which contains organic material between the layers, which method comprises:
   a) providing a reaction mixture comprising water, a source of alkali metal, a source of silicon oxide, and an organic onium compound of the formula $R^1R^2R^3R^4M^+X^-$ wherein each R can have up to 24 carbon atoms and is selected from the group consisting of alkyl or alkenyl, provided at least one R has at least eight carbon atoms, M is an element capable of coordination with said $R^1R^2R^3$ and $R^4$ to form a cation and X is an anion, said mixture having a pH of at least about 9.0;
   b) heating said reaction mixture to a temperature between about 90° C. to about 200° C.; and
   c) maintaining said reaction mixture at a temperature of from 90° C. to 200° C. and a pH of 9 to 14 until crystals of a layered silicate material containing intercalated organic material derived from said onium compound are formed.

2. The method of claim 1 wherein said reaction mixture comprises potassium.

3. The method of claim 1 wherein said onium compound is a quaternary ammonium compound.

4. The method of claim 1 wherein said onium compound is a tetraalkylammonium compound.

5. The method of claim 4 wherein said tetraalkylammonium compound comprises at least one $C_8$ or greater alkyl group.

6. The method of claim 4 wherein said tetraalkylammonium compound comprises at least one $C_{12}$ or greater alkyl group.

7. The method of claim 4 wherein said tetraalkylammonium compound comprises at least one $C_{15}$ or greater alkyl group.

8. The method of claim 4 wherein said tetraalkylammonium compound is a cetyltrimethylammonium salt.

9. The method of claim 1 wherein said reaction mixture is maintained at a temperature from about 125° C. to about 175° C. and a pH of from about 12 to about 14.

10. The method of claim 1 wherein said reaction mixture is agitated during formation of said crystals.

11. The method of claim 1 wherein said source of silicon oxide is amorphous precipitated silica.

12. The method of claim 1 wherein said source of silicon oxide is amorphous precipitated silica and said source of alkali metal is potassium hydroxide.

13. The method of claim 11 wherein said onium compound is a cetyltrimethylammonium salt.

14. The method of claim 1 wherein the reaction mixture has the following molar ratio ranges:
$A_2O/SiO_2 = 0.02$ to $0.15$
$SiO_2/H_2O = 0.02$ to $0.15$
$R^1R^2R^3R^4M^+X^-/SiO_2 = 0.02$ to $0.20$
wherein A is an alkali metal.

15. The method of claim 1 wherein the reaction mixture has the following molar ratio ranges:
$A_2O/SiO_2 = 0.04$ to $0.10$
$SiO_2/H_2O = 0.05$ to $0.10$
$R^1R^2R^3R^4M^+X^-/SiO_2 = 0.05$ to $0.10$
wherein A is an alkali metal.

16. The method of claim 1 wherein said layered silicate is a high silica alkali silicate.

17. The method of claim 16 wherein said high silica alkali silicate is selected from the group consisting of magadiite, natrosilite, kenyaite, makatite, nekoite, kanemite, okenite, dehayelite, macdonaldite, and rhodesite.

18. The method of claim 17 wherein high silica alkali silicate is magadiite.

19. The method of claim 17 wherein said high silica alkali silicate is kenyaite.

* * * * *